US007686341B2

(12) United States Patent
Adamczyk et al.

(10) Patent No.: US 7,686,341 B2
(45) Date of Patent: Mar. 30, 2010

(54) DATA CARRIER, METHOD FOR THE PRODUCTION THEREOF AND GRAVURE PRINTING PLATE

(75) Inventors: Roger Adamczyk, Munich (DE); Reinhard Plaschka, Windach (DE); Karlheinz Mayer, Augsburg (DE); Peter Franz, Bruck (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 11/979,107

(22) Filed: Oct. 31, 2007

(65) Prior Publication Data

US 2008/0290647 A1 Nov. 27, 2008

Related U.S. Application Data

(63) Continuation of application No. 10/362,525, filed as application No. PCT/EP01/10287 on Sep. 6, 2001, now Pat. No. 7,357,077.

(30) Foreign Application Priority Data

Sep. 8, 2000 (DE) ................................ 100 44 464

(51) Int. Cl.

| | |
|---|---|
| ***B42D 15/00*** | (2006.01) |
| ***G09C 1/00*** | (2006.01) |
| ***B41M 1/12*** | (2006.01) |
| ***B41F 1/40*** | (2006.01) |
| ***B41M 1/10*** | (2006.01) |

(52) U.S. Cl. ......................... 283/72; 283/100; 283/117; 283/94; 283/114; 283/82; 283/67; 283/17; 283/98; 283/99; 283/901; 101/150; 101/151; 101/170

(58) Field of Classification Search .................. 101/3.1, 101/32, 150, 170; 156/230, 233, 234, 240; 235/468, 491; 283/57, 58, 67, 70, 72, 74, 283/82, 83, 85, 86, 91, 92, 94, 107, 109, 283/113, 114, 117, 902, 904; 409/84, 132; 427/131; 428/187, 207, 915, 916; 700/184; *B41C 1/02, B41C 1/04, 1/05; B41F 19/00, 19/02; B41M 1/00, B41M 1/24, 3/14; B42D 15/00, 15/10; B44B 5/00, B44B 5/02; G06K 19/06, 19/12; G07D 7/00, G07D 7/12*

See application file for complete search history.

(56) References Cited

U.S. PATENT DOCUMENTS 2,854,336 A 9/1958 Gutknecht (Continued)

FOREIGN PATENT DOCUMENTS

DE 3516210 11/1986

(Continued)

OTHER PUBLICATIONS

100 Krooni Estonian Banknote (1994).

(Continued)

*Primary Examiner*—Dana Ross
*Assistant Examiner*—Justin V Lewis
(74) *Attorney, Agent, or Firm*—Bacon & Thomas, PLLC

(57) ABSTRACT

The invention relates to a data carrier having a security element that is at lest visually testable and has an embossing in at least a partial area, the embossing being a halftone blind embossing executed by inkless line intaglio printing, and to a method for producing the data carrier and a printing plate for blind-embossing a security element.

22 Claims, 7 Drawing Sheets

U.S. PATENT DOCUMENTS

| | | | |
|---|---|---|---|
| 3,523,503 A | 8/1970 | O'Boyle et al. | |
| 4,068,385 A | 1/1978 | Mitzel | |
| 4,294,650 A | 10/1981 | Werthmann | |
| 4,582,566 A | 4/1986 | Grey | |
| 4,588,212 A | 5/1986 | Castagnoli | |
| 4,715,623 A | 12/1987 | Roule et al. | |
| 5,106,125 A | 4/1992 | Antes | |
| 5,182,063 A | 1/1993 | Lang et al. | |
| 5,199,744 A * | 4/1993 | Shenton | 283/91 |
| 5,396,839 A | 3/1995 | Rice | |
| 5,433,807 A * | 7/1995 | Heckenkamp et al. | 156/230 |
| 5,915,731 A | 6/1999 | Jackson | |
| 6,036,232 A | 3/2000 | Kaule et al. | |
| 6,928,925 B1 | 8/2005 | Mayer et al. | |
| 2001/0043842 A1 | 11/2001 | Kaule et al. | |

FOREIGN PATENT DOCUMENTS

| | | |
|---|---|---|
| EP | 0 194 042 | 9/1986 |
| GB | 262212 | 12/1926 |
| JP | 57-4798 | 1/1982 |
| JP | 10-29720 | 11/1998 |
| WO | WO 90/25658 | 3/1990 |
| WO | WO 97/06959 | 2/1997 |
| WO | WO 9706959 A1 * | 2/1997 |
| WO | WO 97/35732 | 10/1997 |
| WO | WO 97/48555 | 12/1997 |
| WO | WO 00/20216 | 4/2000 |

OTHER PUBLICATIONS

Extract from Eesti Vabariigi Rahad—Banknotes and Coins of the Republic of Estonia 1992-2002 (2002).

Surface Profile Analysis of Estonia 100 Banknote (Serial No. BP739672) (2005).

Extract from Optical Document Security, Second Edition, Chapter 7 (1998).

1000 Schilling Banknote and affidavit of Mr. Peter Fajmann (2005).

Partial Dedenture of Bavarian Regional Capital Munich 1994/2004; denomination DM 100 including coupon sheet (prototype) and denomination DM 10,000 including coupon sheet (spec.

Samples of De La Rue Giori S.A. "Cathedral Certificate" using Mini Orlof Intaglio (Est. 1997).

Extracts from a brochure for "Le Mont 2000" including samples using Mini Orlof Intaglio (May/Jun. 2000).

* cited by examiner

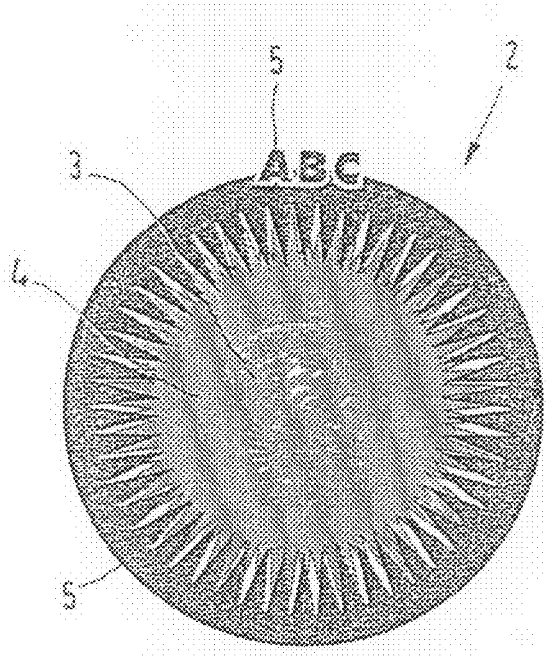
FIG. 3
FIG. 4
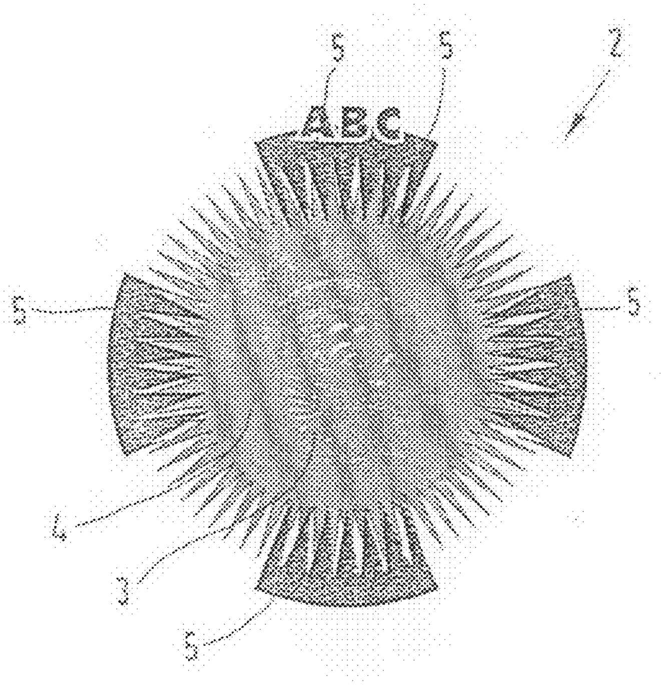

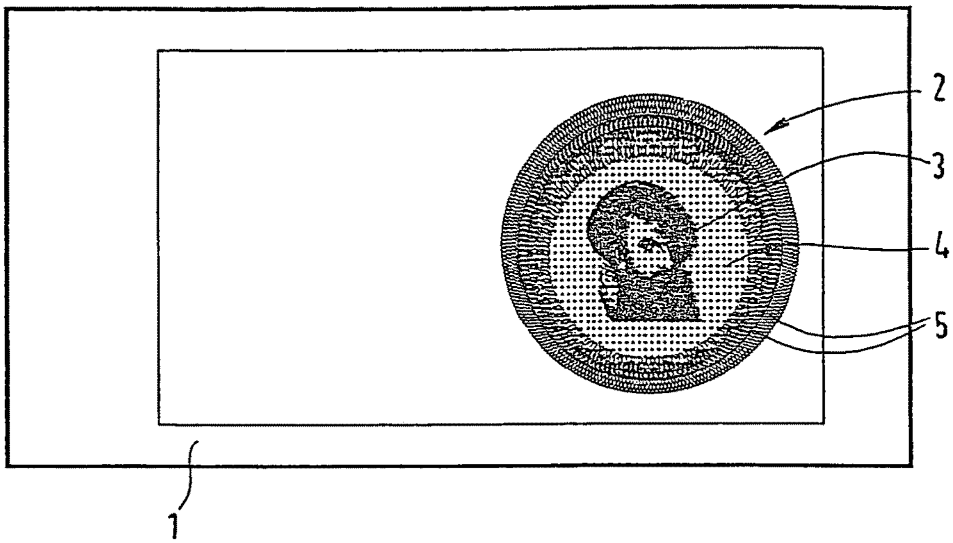
FIG.12
FIG.13
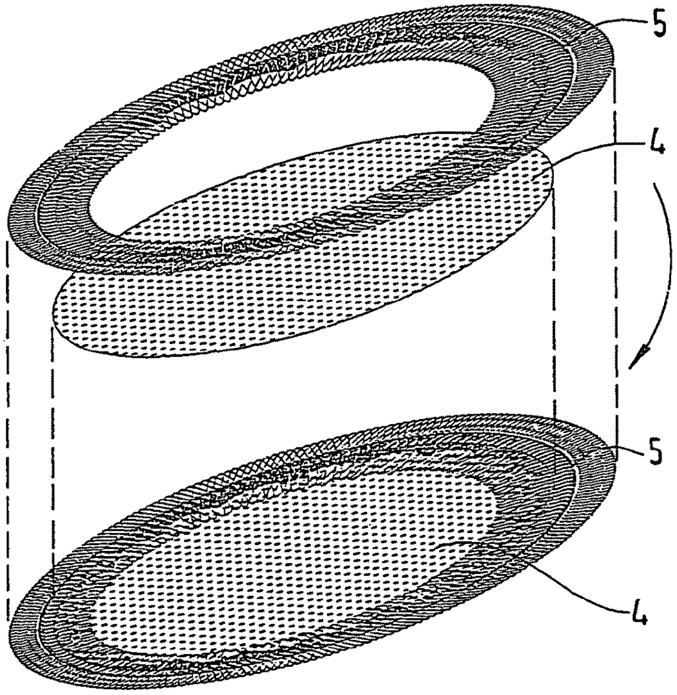

DATA CARRIER, METHOD FOR THE PRODUCTION THEREOF AND GRAVURE PRINTING PLATE

This application is a continuation of U.S. Utility application Ser. No. 10/362,525, filed Sep. 9, 2003.

BACKGROUND OF THE INVENTION

1. Field of the Invention

This invention relates to a data carrier having a security element blind-embossed by intaglio printing and to a method for producing the data carrier and a printing plate for blind-embossing a security element.

2. Related Art

Data carriers according to the invention are security documents or documents of value, such as bank notes, ID cards, passports, check forms, shares, certificates, postage stamps, plane tickets and the like, as well as labels, seals, packages or other elements for product protection. The simplifying designation "data carrier" and "security document or document of value" hereinafter will therefore always include documents of the stated type.

Such papers, whose market or utility value far exceeds the material value, must be made recognizable as authentic and distinguishable from imitations and forgeries by suitable measures. They are therefore provided with special security elements that are ideally not imitable or only with great effort and not falsifiable.

In the past, particularly those security elements have proved useful that can be identified and recognized as authentic by the viewer without aids but can simultaneously only be produced with extremely great effort. These are e.g. watermarks, which can be incorporated into the data carrier only during papermaking, or motifs produced by intaglio printing, which are characterized by their characteristic tactility that cannot be imitated by copying machines.

It is distinctive for gravure printing that the printing, i.e. ink-transferring, areas of the printing plate are present as depressions in the plate surface. These depressions are produced by a suitable engraving tool or by etching. Before the actual printing operation, ink is applied to the engraved plate and surplus ink removed from the surface of the plate by means of a stripping doctor blade or wiping cylinder so that ink is left behind only in the depressions. Then a substrate, normally paper, is pressed against the plate and removed, whereby ink adheres to the substrate surface and forms a printed image there. If transparent inks are used, the thickness of the inking determines the color tone.

Among gravure printing techniques a distinction is made between rotogravure and intaglio. In rotogravure the printing plates are produced for example by means of electron beam, laser beam or graver. It is distinctive for rotogravure that different gray or color values of the printed image are produced by cells of different density, size and/or depth disposed regularly in the printing plate.

In contrast, in intaglio linear depressions are formed in the printing plates to produce a printed image. In the mechanically fabricated printing plate for intaglio printing, a wider line is produced with increasing engraving depth due to the usually tapered engraving tools. Furthermore, the ink receptivity of the engraved line and thus the opacity of the printed line increases with increasing engraving depth. In the etching of intaglio printing plates, the nonprinting areas of the plate are covered with a chemically inert lacquer. Subsequent etching produces the depressions provided for receiving ink in the exposed plate surface, the depth of these lines depending in particular on the etching time and line width.

The high bearing pressure in intaglio printing causes the substrate material to additionally undergo an embossing that also stands out on the back of the substrate. If the intaglio printing plate is used without inking, the substrate used is subjected to so-called blind embossing, which gives the data carrier a typical surface relief.

Intaglio printing, in particular steel intaglio printing, thus provides a characteristic printed or embossed image that is easily recognizable to laymen and cannot be imitated with other common printing processes. If the engravings in the printing plate are deep enough, a data carrier printed by intaglio acquires through embossing and inking a printed image that forms a relief perceptible by the sense of touch. Steel intaglio printing is therefore preferably used for printing data carriers, in particular security documents and documents of value, for example bank notes, shares, bonds, certificates, vouchers and the like, which must meet high standards with respect to forgery-proofness.

WO 97/48555 discloses a method for producing intaglio printing plates reproducibly by machine. The lines of an original intaglio are detected and the surface of each line precisely determined. Using an engraving tool, for example a rotating graver or laser beam, the outside contour of this surface is first engraved to cleanly border the surface. Then the bordered area of the surface is cleared by the same or another engraving tool so that the total surface of the line is precisely engraved in accordance with the line original. Depending on the form and guidance of the engraving tool, a basic roughness pattern serving as an ink trap for the ink arises at the base of the cleared surface.

It has likewise been proposed to use intaglio printing plates for producing blind embossings. Blind embossings in a metal layer are also known from the prior art. However, known blind embossings are very simple embodiments having only one predetermined embossing height or depth. That is, embossing is effected with a printing plate having only a one-step engraving with a certain constant depth. Embossed areas with different engraving depths, such as lines of different depth, are always spaced apart by unengraved areas. Such embossings are visually recognizable only at certain oblique viewing angles so that this security feature is frequently not perceived by the viewer and attempts at forgery are thus more easily missed. Such embossings are also normally rather unimpressive for the viewer.

BRIEF SUMMARY OF THE INVENTION

The problem of the present invention is to increase the forgery-proofness of data carriers by applying to the data carrier a harder-to-imitate, more complicated security feature that is readily visible and of optically striking design.

The inventive data carrier comprises a security element that is at least visually testable and has in at least a partial area an embossing that is a halftone blind embossing executed by inkless intaglio printing.

The halftone blind embossing is a blind embossing with a plurality of different embossing heights or depths that preferably run smoothly into each another. Preferably, the halftone blind embossing represents a stereoscopic image of a three-dimensional original, e.g. of plastic art or a relief. Alternatively it is also possible to start out from a two-dimensional original and convert it into a three-dimensional original according to corresponding specifications, e.g. in dependence on the colors, halftones, line widths, etc., present in the two-dimensional original. In the next step, starting out from the three-dimensional original to be reproduced as an embossing, a halftone image specially adapted for the printing plate milling is produced in which the gray values are assigned to certain engraving depths.

The areas that are to stand out most in the embossing are preferably assigned the darkest gray level and thus greatest engraving depth, and the areas to be more recessed assigned a lighter gray level and thus smaller engraving depth. Upon conversion of the halftone image into an engraving, a three-dimensional relief is produced in the engraved plate. The engraving tool can be guided so as to yield a continuous engraving depth pattern. In particular, a sharp and trenchant representation can be obtained in the paper by emphasizing edges of the motif contours.

In a simple embodiment, the original consists of alphanumeric characters and/or simple graphic elements disposed as text or the like. The characters and/or elements have different relief heights, resulting in a “modulated” surface structure. The effect is enhanced if the characters and/or elements also vary in size.

According to a preferred embodiment, an original, for example portrait, is used that can be converted into a plurality of different halftones or gray levels. The individual gray levels or groups of gray levels of this conversion are then assigned different engraving depths, for example, maximum engraving depth for black and minimum engraving depth for white. That is, e.g. the nose of a portrait, which usually has a bright highlight in the original, must be represented in black at its highest point in the halftone image, causing the engraving to be deeper at this place and the thus produced embossing to be elevated above the paper surface. All image parts in the portrait are accordingly to be converted into corresponding gray values. The halftone image converted into engraving depths is then used for controlling the engraving tool. The areas milled at different depth are directly adjacent. That is, they are not separated by areas located at the printing plate level. The engraving depths can reach up to 300 microns and more, preferably reaching up to 250 microns. The engravings can fundamentally also be produced by laser engraving, as mentioned above.

The thus produced intaglio printing plate having a three-dimensionally engraved relief is finally used to emboss the data carrier, a three-dimensional relief again being produced in the data carrier. This is essentially a printing operation, but without transfer of ink. The data carrier is pressed, as usual in intaglio printing, into the depressions of the engraved plate and lastingly deformed, i.e. embossed, by the strong bearing pressure. The plate areas with the greatest engraving depth produce the strongest embossings, i.e. the areas where paper is most greatly deformed, and the plate areas with the smallest engraving depths produce the weakest embossing. The paper that comes in contact with the unengraved areas of the printing or embossing plate is uniformly compressed by the high bearing pressure and compacted at least on the surface, causing these surface areas to have increased gloss after line intaglio printing.

The gloss or visual impression of the embossed image parts can also be selectively influenced. As mentioned at the outset in connection with the engraving technique explained in WO 97/48555, a roughness pattern at the base of the surface cleared by the engraving can be selectively produced by the form and guidance of the engraving tool. In blind embossing, this roughness of the embossing plate influences the visual impression of the embossed areas. Thus, engraving tools with a large tip radius and circular geometry and closely adjacent clearing paths (for example about 10 microns) achieve smooth engravings that produce smooth and tangentially rather reflective embossings. If the engraving tool selected has a small tip radius with pointed cutting-edge geometry and further-spaced clearing paths (for example in the range of about 50 microns), on the other hand, the engravings obtained are rough and structured and produce a matt and diffusely scattering embossing.

An alternative or additional way of varying the light scatter of an embossed substrate is to change the clearing direction in individual partial areas during engraving of the depressions in the printing or embossing plate. Engravings formed along clearing paths that are linear but for example rotated by 90° produce visually distinguishable embossings with different reflection of light. The same also applies to engravings with straight or meandering clearing paths in comparison with spiral-shaped or concentric clearing paths. These effects can not only be used for a more appealing or striking design of the blind embossing, but simultaneously also increase its forgery-proofness. This selectively used engraving technique can be used to superimpose structures on the embossed relief that are distinctly recognizable only at certain viewing or reflection angles.

In bank notes or other documents of value, the halftone blind embossing rendering a portrait could be superimposed for example by a denomination through the engraved substructures.

The embossed image is three-dimensional and has a relatively complex structure. The surface occupied by the halftone blind embossing is not subject to any limitations. Preferably, the halftone blind embossing occupies a surface of 0.25 square centimeters to several square centimeters.

The halftone blind embossing can represent any geometrical element, e.g. with a circular, triangular, square or asymmetric outline structure, a pictorial symbol, character or other symbol. However, the representation of a portrait is especially preferred since human perception is trained to recognize extremely fine differences in portraits, making the recognition value of this security element especially great. A plurality of halftone blind embossings can also be combined in any number and form.

In order to further increase the forgery-proofness of the security element, the halftone blind embossing can be combined with a background print not executed by intaglio printing. This background print is applied in a separate printing operation before production of the halftone blind embossing. The background print is preferably effected in solid fashion. It can be produced for example by screen printing, offset, indirect letterpress, letterpress or digital printing.

Any inks can be used for the background print, but it is preferable to use special-effect inks that have an additional antiforgery effect and are difficult to imitate due to their physical properties. Particularly suitable inks are metallic inks, metal-pigmented inks or interference-layer-pigmented inks, for example IRIODINE® from Merck.

Alternatively, the background print can also consist of a metal layer, which is applied to the data carrier for example by the hot stamping method.

The halftone blind embossing is preferably located completely in the area of the background print. In a special embodiment, the background print consists of an oval or circular metallic print. This background print is then provided with a halftone blind embossing by intaglio printing. Ideally, the halftone blind embossing is disposed centrally relative to the background print to produce the impression of a coin representation.

Since the background print and the halftone blind embossing are applied to the substrate in different printing operations, however, register inaccuracies can occur. These register inaccuracies can be camouflaged by a combination with accordingly designed colored areas disposed in register with the halftone blind embossing, so that the viewer has the impression of an exactly registered halftone blind embossing centered in the background print. Halftone blind embossing and colored area or areas are preferably spaced apart, unless elements of the blind embossing are selectively guided into the colored areas to produce an optical bridge.

The colored areas are disposed in overlap with the background print and designed with respect to their form and color in such a way that the edge of the background print is "optically resolved," i.e. smooth edge contours are avoided and any tolerances effectively concealed or disguised. It is particularly suitable to use for the colored areas line patterns, such as guilloche patterns, but also solid prints, in particular solid prints having a suitable ink layer thickness to cover the background print, or having the same color tone as the background print.

According to a preferred embodiment, the colored area forms a border around the halftone blind embossing. The border can have any contours. However, it is preferably oval or circular and disposed at a fixed distance around the blind embossing so that the blind embossing is disposed centrally relative to the colored area. The border can be continuous or interrupted. It can likewise be executed areally or in the form of patterns. The border is preferably executed in the form of guilloches or rings with optically resolved inside edges, for example serrations pointing to the center. The border can likewise be composed of characters or have geometrical patterns, such as guilloches, that are combined with characters for example. The edge of the background print can also be thus designed. If the resolution of the edges is effected by a periodic structure, such as serrations, guilloches, arcs, etc., that is realized both in the colored area and in the edge of the background print, the production of a phase or frequency difference between the periodic structure of the background print and of the colored area can achieve an optimization of the "optical resolution" or disguise.

Register accuracy between halftone blind embossing and colored print can be obtained especially simply if both are produced by intaglio printing. In this case, an intaglio printing plate is provided both with the engraving for the halftone blind embossing and with the engraving for the colored areas in one operation. The high ink layer thicknesses of intaglio printing are especially advantageous here, as they can effectively cover any background print that is present.

This intaglio printing plate is preferably produced by engraving with a fast rotating, tapered graver, as all other inventive intaglio printing plates are. In accordance with the contour form of the surface to be printed or blind-embossed, the engraving tool forms depressions with selective variation of the engraving depth in the surface of the printing plate. If the engravings for the halftone blind embossing and colored areas are adjacent at certain places, it is expedient to provide separation edges in these borderline areas, as known from DE 198 45 436 A1, to prevent ink from entering the area of the halftone blind embossing or flowing further into the blind embossing.

Before the printing operation, only the parts of the engraving producing the colored areas are filled with ink. During printing, the substrate is pressed both into the ink-carrying and into the inkless engraved areas of the printing plate. Ink is thereby transferred from the ink-carrying parts of the engraving to the substrate. Simultaneously the substrate is embossed, as is usual in intaglio printing. In the inkless areas of the intaglio printing plate, however, the substrate is solely embossed. No ink is transferred from the untreated, i.e. unengraved, surface areas of the printing plate.

When a data carrier is printed or embossed with the method just described, an accordingly designed embossing of the data carrier results in dependence on the form of the above-described engraving of the printing plate, whereby some of these embossed areas are provided with ink. The dimensions of the ink layer areas, such as width and ink layer thickness, result from the engraving depths and widths of the inventive printing plate and in dependence on the ink used in printing.

Depending on the selected ink layer thickness, the usual intaglio inks can be printed to be opaque or, to a certain degree, transparent and translucent. Suitable layer thicknesses and an expedient choice of background color result in color tones of different brightness and color saturation. If the ink layer thicknesses are sufficiently different, readily visible contrasts result for the human eye without further aids. This presupposes normal lighting conditions and a normal viewing distance.

In order to increase the stability of the data carrier it can be expedient to fill the embossing occurring on the front of the security element with a coating, such as a lacquer. This lacquer can contain feature substances, such as luminescence substances, etc., or other special-effect pigments, such as liquid-crystal pigments. Moreover, the lacquer can be executed to be matt or glossy. In addition, the protective lacquer layer also serves to enhance the glossy effect and the protection of the embossing.

The data carrier provided with this complex security element is characterized by elevated forgery-proofness due to the high-contrast light-and-shadow effects produced by the multistep halftone blind embossing. The combination with colored, possibly also tactile, intaglio prints disposed in register with the halftone blind embossing and in overlap with the background print additionally increases the protection against forgeries and imitations.

A further way of increasing forgery-proofness is to provide the motif of the halftone blind embossing on the data carrier several times but by a different technique in each case. For example, the same motif can be used for a watermark and/or a classic colored intaglio print. It is also possible to repeat the same motif in the background print, in an embossed hologram, by means of fluorescent or optically variable inks (for example with interference-layer or liquid-crystal pigments) or by a so-called latent image and in any combination of the abovementioned alternatives.

The inventive security element can be applied either to the individual data carrier or to substrates having a plurality of data carrier copies.

Suitable substrates or data carrier materials are all substrate materials that can be used for intaglio printing, such as paper, plastic foils, paper laminated with plastic foils or coated paper, and multilayer composite materials. The inventive method is in particular suitable for printing data carriers that must meet standards with respect to forgery-proofness, such as security documents and documents of value, for example bank notes, shares, bonds, certificates, vouchers and the like.

DESCRIPTION OF THE DRAWINGS

Further embodiments and advantages of the invention will be explained in the following with reference to the figures, in which:

FIGS. 3 to 6 show different embodiments of the inventive security element, FIG. 12 shows an inventive data carrier in a front view, FIG. 13 shows an arrangement of background print and colored area.

DETAILED DESCRIPTION OF PREFERRED EMBODIMENTS OF THE INVENTION

Figure 1:
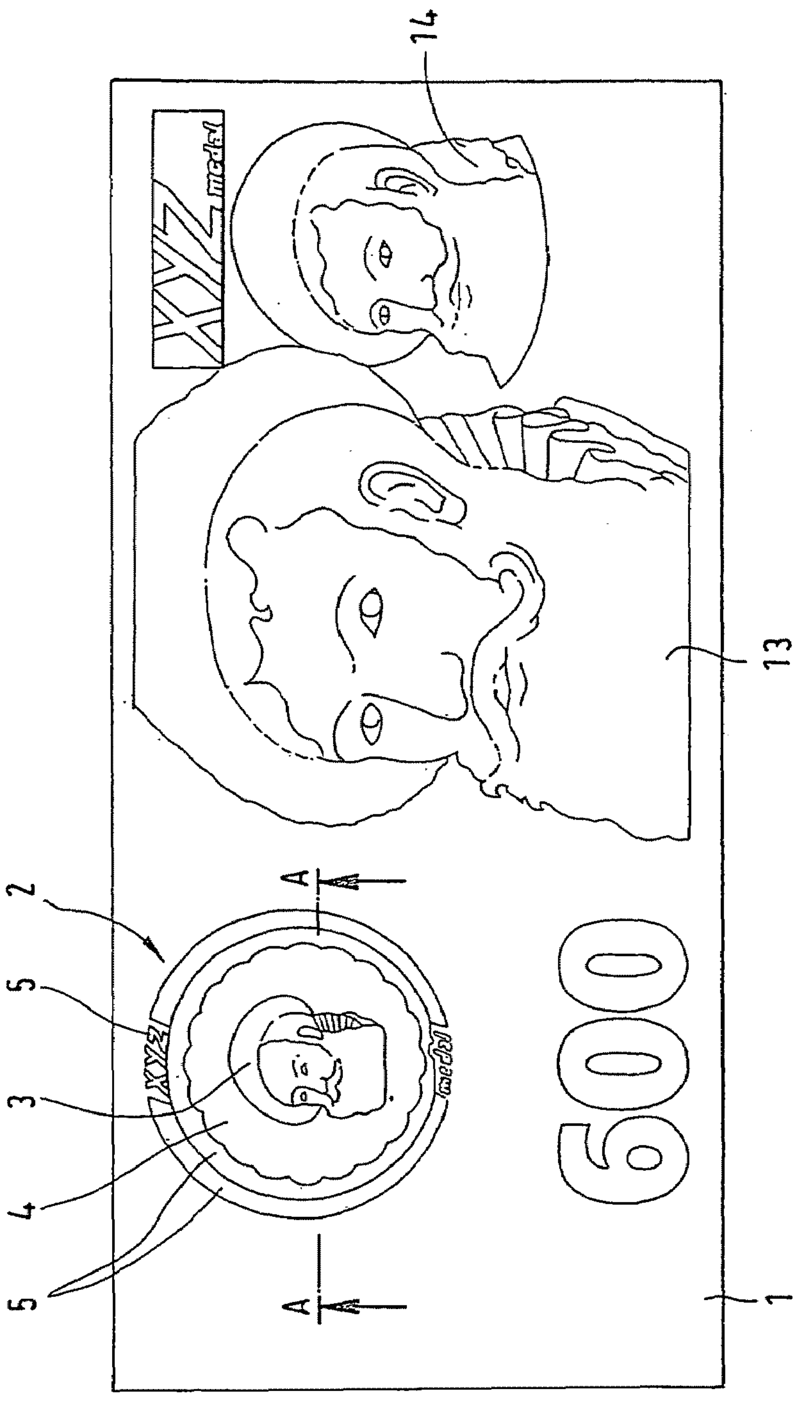
FIG. 1 shows a bank note in a front view.

FIG. 1 schematically shows bank note 1 as a data carrier, having inventive security element 2. Inventive security element 2 comprises background print 4, halftone blind embossing 3 and colored areas 5 that are disposed in register with halftone blind embossing 3. In order to increase the forgery-proofness of bank note 1, the motif of halftone blind embossing 3 is repeated on the bank note several times in different techniques. In the shown example, the motif is provided in bank note 1 for example as steel-engraved portrait 13 and again as watermark 14.

In the shown example, inventive security element 2 has the form of a coin in which halftone blind embossing 3 is present in preferably metallic background print 4. Background print 4 is overlapped by colored print 5, which can be multicolored and/or have patterns, characters or the like. In the shown example, colored areas 5 are shown as solid borders around halftone blind embossing 3 that are combined in certain areas with the characters "XY Z" and "medal." Colored areas 5 can be designed depending on the engraving depth of the printing plate so as to yield a tactile edge in the printed image.

The colored areas can also have any other form, however. They can thus consist of guilloche patterns for example. Colored areas 5 can additionally be color coordinated with background print 4 so that the edge of background print 4 is "resolved" for the viewer, i.e. hidden.

For producing inventive security element 2, the data carrier is provided in a first step with background print 4. The solid background print is preferably produced by screen printing using a gold- or silver-colored metallic pigment ink. Then halftone blind embossing 3 and colored areas 5 are produced in the area of background print 4 by intaglio printing in one working step. That is, the associated intaglio printing plate has both an engraving according to colored areas 5 and an engraving according to halftone blind embossing 3. For the printing operation, however, only the engraved areas that produce colored areas 5 are filled with ink. This causes data carrier 1 to be embossed and provided with ink in the area of colored areas 5 during the printing operation, as usual in intaglio printing. In the area of the halftone blind embossing, however, the data carrier is only embossed. Due to the high bearing pressure with which data carrier 1 is pressed into the engraved areas of the steel intaglio printing plate, data carrier 1 shows a recognizable embossing on the back as well.

Figure 2:
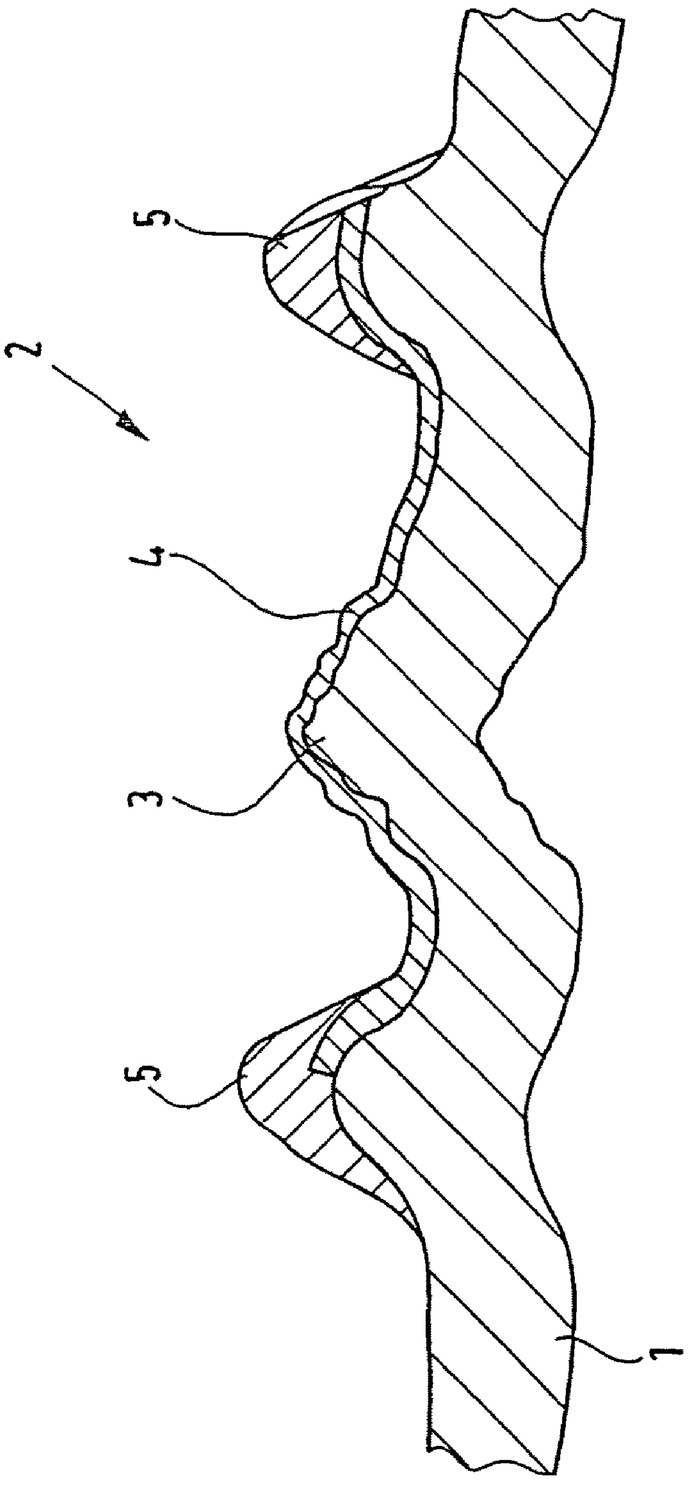
FIG. 2 shows a section along A-A in FIG. 1.

This state of affairs is shown in FIG. 2. FIG. 2 shows a section along A-A through inventive security element 2. It can be seen that data carrier 1 or background print 4 is only embossed in the area of halftone blind embossing 3 during the intaglio printing operation. Since background print 4 is applied to data carrier 1 in a separate operation, register inaccuracies can arise between background print 4 and the halftone blind embossing or colored areas 5. For this reason, colored areas 5 are preferably disposed in overlap with background print 4 in order to disguise such register inaccuracies, as shown in FIG. 2. As likewise apparent from FIG. 2, background print 4 is covered much less by colored areas 5 in the left area than on the right side. Since colored areas 5 are disposed in register with halftone blind embossing 3, however, the halftone blind embossing appears to the viewer to be centered in the area of background print 4.

According to an embodiment, the distance between the halftone blind embossing and the at least one coloured area is at least 1 millimeter, and in another embodiment the distance may be at least 3 millimeters.

For the viewer, the optical effect of the three-dimensional relief of the halftone blind embossing is strengthened by the different light-and-shadow effects, in particular if background prints with metallic luster are used.

The technique of exact registration of areas printed and embossed by intaglio printing can be used to assemble motifs of printed and embossed portions. For example, the trunk and branches of a tree could be blind-embossed and the leaves or treetop printed with ink. In the case of text or other regularly disposed structures, an exactly registered, linear arrangement of alternately printed and embossed symbols or picture elements is also possible.

FIGS. 3 to 6 show different embodiments of security element 2 in a front view. In FIG. 3, background print 4 has a ray-like resolved edge. Colored areas 5 form a solid circular border here, which is printed preferably concentrically with background print 4 and whose inside edge is resolved in the form of rays pointing to the center of the circle. Different frequencies of the intermeshing rays of background print and colored area printed by intaglio obtain an optical disguise of register tolerances between these two prints.

FIG. 4 differs from the example shown in FIG. 3 only in so far as border 5 does not cover the total circumference of the raylike edge of background print 4 here, but is only present in partial areas.

Figure 5:
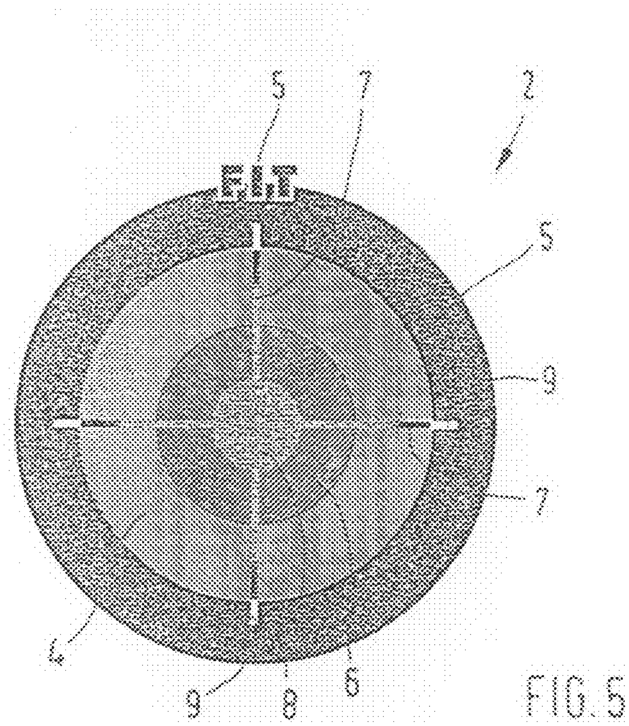

FIG. 5 shows the principle of a further embodiment of security element 2 wherein at least parts of the halftone blind embossing are drawn up to colored areas 5 in register and continued in the form of gaps in colored areas 5. The schematically indicated halftone blind embossing is assembled of differently hatched or shaded areas 6, 7, 8 in this example. Elements 7 of the halftone blind embossing form a hairline cross and reach as far as colored border 5. The embossed hairline cross formed by embossed elements 7 is continued in colored border 5 in the form of gaps 9. This exact register between embossed elements 7 and gaps 9 is only possible by simultaneous production of the embossing and colored border 5 with an intaglio printing plate in one operation. Any attempted forgeries in which the embossing of areas 6, 7, 8 and colored areas 5 are produced independently of each other cannot obtain such a register. Such register shifts are easy to recognize visually, so that forgeries can readily be distinguished from authentic documents.

Figure 6:
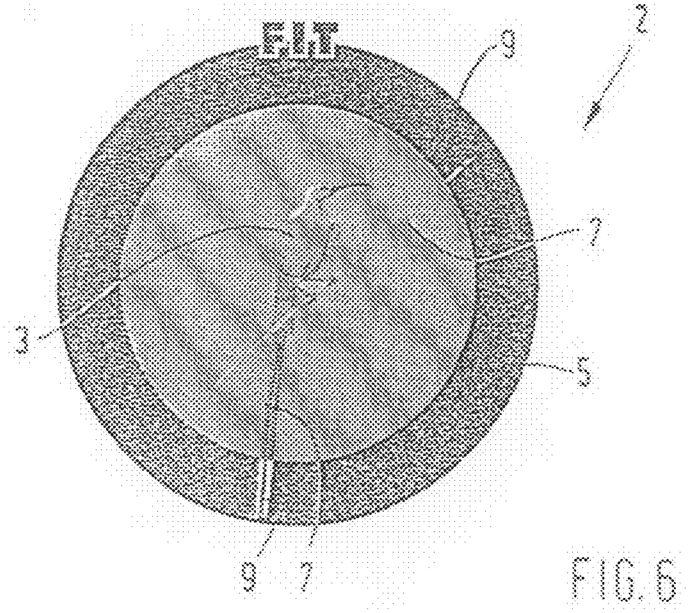

FIG. 6 shows a further embodiment of the principle shown in FIG. 5. In this example, halftone blind embossing 3 shows a bird with a branch. One end of the branch is formed by embossed element 7 that reaches as far as colored border 5 and is continued there as negative image or gap 9 in printed area 5. The same applies to the bird's tail feathers. They too are drawn as embossed elements 7 up to colored areas 5 and continued there in the form of gaps 9.

Figure 7:
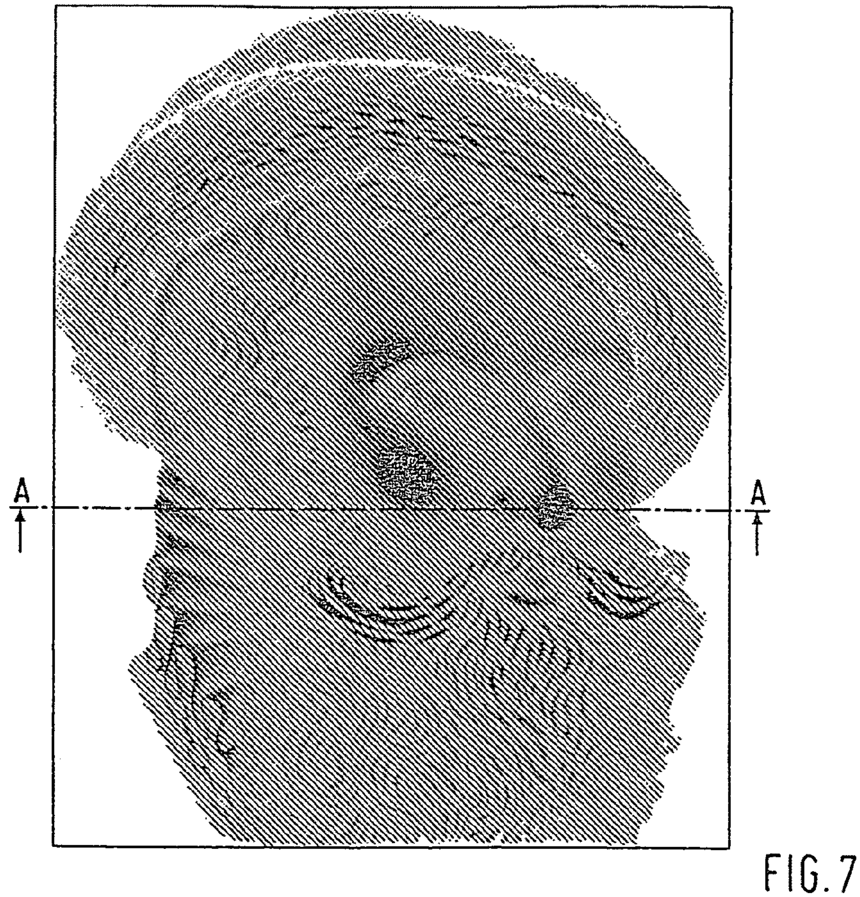
FIG. 7 shows a halftone image for an inventive halftone blind embossing.

FIG. 7 shows a halftone image whose data can be used for producing an inventive intaglio printing plate. The halftone image was produced starting out from a three-dimensional original, whereby darker gray levels are to be assigned to areas that are to be stand out more in the later embossing. The different gray levels of this halftone image are assigned to different engraving depths, and these data passed on to a milling machine, e.g. a CNC (computer numerical control) milling machine, which engraves the intaglio printing plate in accordance with this information.

Figure 8:
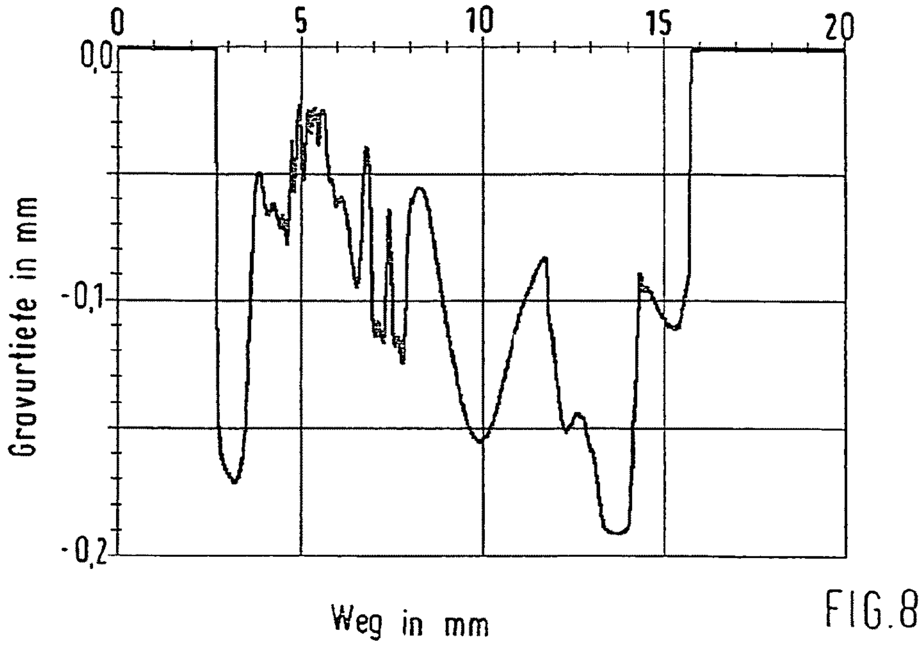
FIG. 8 shows an engraving depth pattern of an inventive intaglio printing plate along A-A in FIG. 7.

FIG. 8 shows the engraving depth pattern along line A-A in FIG. 7. The greatest engraving depths are located in the area of the tip of the nose and in the area of the neck frill, which are shown as deep-black areas in FIG. 7. All halftones located between these areas have a smaller engraving depth.

Figure 9:
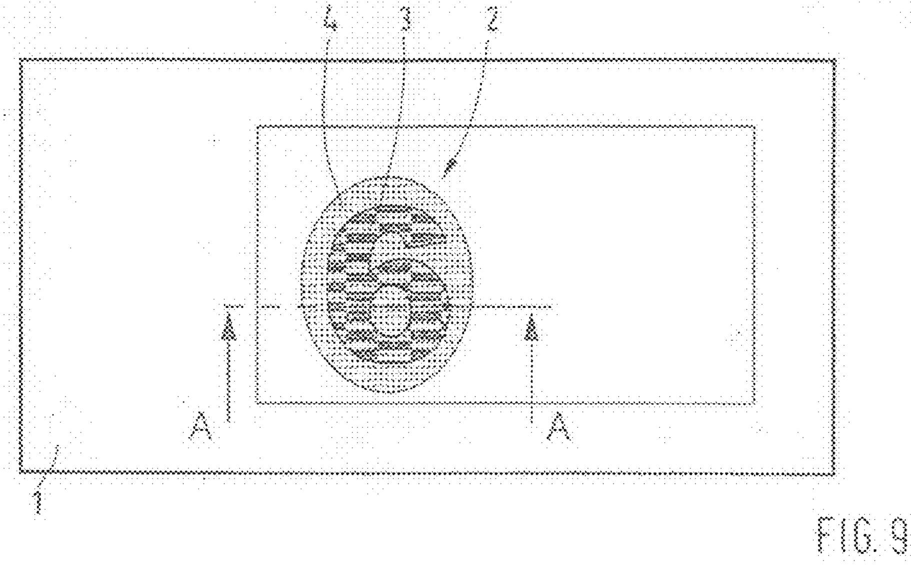
FIG. 9 shows a data carrier with a further embodiment of the invention.

FIG. 9 schematically shows bank note 1 as a data carrier, with a further embodiment of inventive security element 2.

Inventive security element 2 consists of background print 4 in the form of an oval badge represented by black dots, and halftone blind embossing 3 representing the number "6" applied preferably in the center of background print 4. Background print 4 preferably comprises an effect layer that is given a metallic, especially preferably a bronze-, gold- or silver-metallic, appearance to create the impression of a coin for the viewer.

Figure 10:
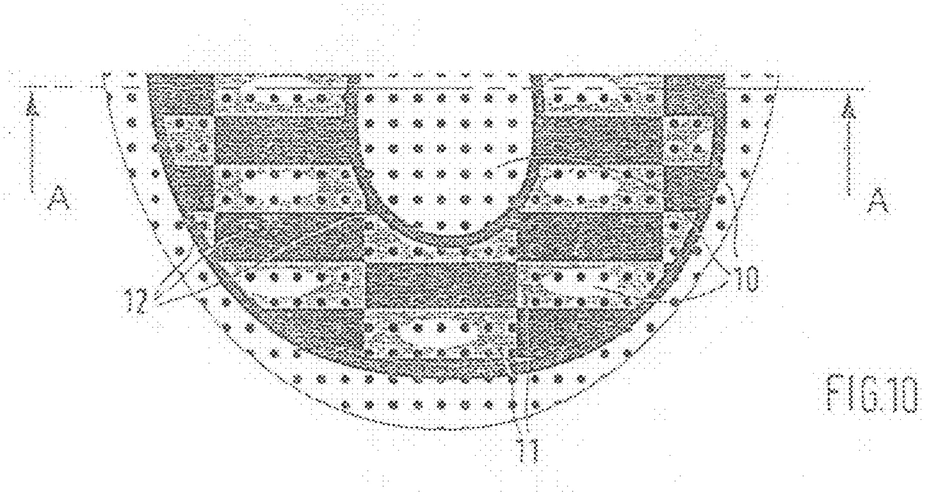
FIG. 10 shows an enlarged detail from FIG. 9.

FIG. 10 shows an enlarged detail of security element 2 shown in FIG. 9, showing cutting line A-A and the lower third of the number "6" located below this line.

In this example, halftone blind embossing 3 is assembled of three different embossing levels 10, 11 and 12 that are realized by stair-like steps in the embossed image. More than three different embossing levels can of course also be incorporated. White areas 10 shown in FIG. 10 represent areas that are not, or extremely slightly, embossed, while light-gray areas 11 represent areas that are more greatly embossed than areas 10, and dark-gray areas 12 have the greatest embossing. Smoothing the data carrier material, such as paper, or the background print results in special gloss in unengraved or extremely slightly engraved areas 10. Areas 11 and 12, on the other hand, have a matt effect.

Figure 11:
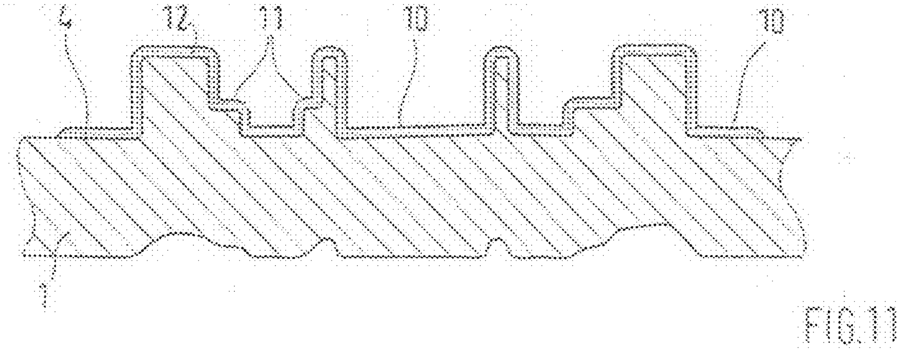
FIG. 11 shows a section along A-A in FIG. 9.

FIG. 11 schematically shows data carrier 1 with background print 4 in cross section along line A-A, as shown in FIG. 10. Different embossing levels 10, 11 and 12 can be distinctly recognized. Areas 10 are greatly smoothed or unembossed areas that are produced with the unengraved areas of the printing plate in the embossing. Areas 11 and 12 show a medium or strong embossing of the data carrier and are accordingly produced with the printing plate areas of medium or great engraving depth.

The varied gradation of a plurality of embossing levels in one embossed image and the diverse possibilities of combining these levels lead to a complex security element with high recognition value.

FIG. 12 again shows inventive data carrier 1, for example a bank note with security element 2. Dotted background print 4 was produced as a shiny gold-colored surface by indirect letterpress. Then halftone blind embossing 3 was produced simultaneously with colored area 5 during an intaglio printing pass, thereby guaranteeing an absolutely exactly registered arrangement of the blind embossing with the color print framing it. Colored area 5 has fine guilloche structures which are difficult to reproduce. To permit the colored area to be better integrated graphically into its surroundings and to make the transition between the background print and the color print softer, the color print preferably has a "broken-up" outer and inner area that includes fine, intertwined lines in positive representation that cause only low coverage. The central area has high coverage, on the other hand, and is traversed by fine lines in negative representation for example.

The advantage of this embodiment and arrangement is illustrated by FIG. 13, which shows the positioning of colored area 5 relative to background print 4 in the manner of an exploded drawing. The halftone blind embossing is not rendered in this representation. Colored area 5 is disposed over background print 4 such that the central area of color print 5 with the high coverage lies over the edge of background print 4. Since background print 4 and color print 5 are printed by different printing methods and in mutually independent printing passes, register tolerances necessarily result, which can amount to several millimeters and would considerably disturb the appearance of the document provided with the security element. These inaccuracies in the positioning of the two prints are compensated and effectively hidden by the embodiment and arrangement shown in FIG. 13.

We claim:

1. A data carrier comprising a security element that is at least visually testable and has an embossing in at least a partial area, wherein the embossing is a halftone blind embossing executed by an inkless intaglio printing plate having an engraved relief provided thereon, and the halftone blind embossing being formed from the engraved relief and having a plurality of different embossing heights or depths that run smoothly into each other such that the halftone blind embossing represents a stereoscopic image of a three-dimensional original;

wherein the halftone blind embossing is in the form of alphanumeric characters, graphic elements or halftone images;

wherein at least one colored area executed by intaglio printing is present in exact register in addition to the halftone blind embossing, and the halftone blind embossing and the at least one colored area are spaced apart;

wherein the halftone blind embossing is applied completely to a background print not executed by intaglio printing;

wherein the background print overlaps at least in a partial area with at least one colored area.

2. The data carrier according to claim 1, wherein the distance between the halftone blind embossing and the at least one colored area is at least 1 millimeter.

3. The data carrier according to claim 1, wherein the halftone blind embossing and at least one colored area are directly adjacent.

4. The data carrier according to claim 1, wherein the halftone blind embossing is disposed centrally relative to the at least one colored area.

5. The data carrier according to claim 1, wherein the at least one colored area is executed as a border around the halftone blind embossing.

6. The data carrier according to claim 1, wherein the at least one colored area constitutes guilloches.

7. The data carrier according to claim 1, wherein the background print is printed by screen printing, offset or indirect letterpress.

8. The data carrier according to claim 1, wherein the background print is an effect layer.

9. The data carrier according to claim 8, wherein the effect layer consists of metal, a metallic ink or an ink containing interference-layer pigments.

10. The data carrier according to claim 8, wherein the effect layer is bronze-, gold- or silver-colored.

11. The data carrier according to claim 1, wherein the background print and at least one colored area are color coordinated with each other.

12. The data carrier according to claim 1, wherein a motif formed of the halftone blind embossing is provided on the data carrier several times and by different techniques.

13. The data carrier according to claim 1, wherein a watermark and a further printed additional element are present in addition to the halftone blind embossing, the watermark, the additional element and the halftone blind embossing having the same motif.

14. The data carrier according to claim 13, wherein the additional element is printed by intaglio printing.

15. The data carrier according to claim 1, wherein the halftone blind embossing has partial areas with different roughness that cause a visually distinguishable reflection of light.

16. The data carrier according to claim 1, wherein the halftone blind embossing has substructures superimposed thereon at least in partial areas that influence its visual appearance and have a different orientation in individual partial areas.

17. The data carrier according to claim 1, wherein the blind embossing is a portrait.

18. The data carrier according to claim 2, wherein the distance between the halftone blind embossing and the at least one colored area or areas is 3 mm.

19. The data carrier according to claim 1, wherein the background print and the at least one colored area has the same color tone.

20. The data carrier according to claim 11, wherein the background print and the at least one colored area have the same color tone.

21. The data carrier according to claim 1, wherein the pattern of the halftone blind embossing is comprised of indicia that is uniform among and distinguishes a set of data carriers.

22. A method for producing a data carrier having a security element comprising the following steps:

a) providing a data carrier material, b) producing an intaglio printing plate while engraving a three-dimensional relief into the plate surface, the three-dimensional engraved relief having a continuous engraving depth pattern providing a plurality of different embossing heights or depths that run smoothly into each other for blind-embossing in step (c) and representing a stereoscopic image of a three-dimensional original, and c) blind-embossing the data carrier material with the intaglio plate produced in step b) such that a halftone blind embossing is produced that represents a stereoscopic image of a three-dimensional original, the halftone embossing having a plurality of different embossing heights or depths that run smoothly into each other;

wherein the halftone blind embossing is in the form of alphanumeric characters, graphic elements or halftone images.

* * * * *